US008282025B2

(12) United States Patent
Ogata et al.

(10) Patent No.: US 8,282,025 B2
(45) Date of Patent: Oct. 9, 2012

(54) EJECTOR

(75) Inventors: Gouta Ogata, Nisshin (JP); Haruyuki Nishijima, Obu (JP); Etsuhisa Yamada, Kariya (JP); Mika Gocho, Obu (JP)

(73) Assignee: Denso Corporation, Kariya (JP)

( * ) Notice: Subject to any disclaimer, the term of this patent is extended or adjusted under 35 U.S.C. 154(b) by 226 days.

(21) Appl. No.: 12/807,313

(22) Filed: Sep. 1, 2010

(65) Prior Publication Data
US 2011/0061423 A1 Mar. 17, 2011

(30) Foreign Application Priority Data
Sep. 10, 2009 (JP) ................................. 2009-208948

(51) Int. Cl.
*B05B 1/04* (2006.01)
(52) U.S. Cl. ........................................ 239/594; 239/593
(58) Field of Classification Search .................. 239/594, 239/589, 592, 593, 597
See application file for complete search history.

(56) References Cited

U.S. PATENT DOCUMENTS

| | | | | | |
|---|---|---|---|---|---|
| 1,730,099 | A | * | 10/1929 | Tribbett | 239/589 |
| 3,545,679 | A | * | 12/1970 | Mcallister et al. | 239/265.15 |
| 4,300,723 | A | * | 11/1981 | Prasthofer | 239/499 |
| 7,347,259 | B2 | * | 3/2008 | Ravensbergen et al. | 166/242.4 |
| 8,191,383 | B2 | * | 6/2012 | Ogata et al. | 62/500 |
| 2009/0229304 | A1 | | 9/2009 | Ogata et al. | |

FOREIGN PATENT DOCUMENTS

| | | |
|---|---|---|
| JP | 11-37577 | 2/1999 |
| JP | 2009-221883 | 10/2009 |

* cited by examiner

*Primary Examiner* — Davis Hwu
(74) *Attorney, Agent, or Firm* — Harness, Dickey & Pierce, PLC

(57) ABSTRACT

In an ejector, a refrigerant passage of a nozzle for decompressing and expanding refrigerant includes a throat portion in which a refrigerant passage sectional area is most reduced, a first taper portion arranged downstream of the throat portion to gradually enlarge the refrigerant passage sectional area, a second taper portion arranged downstream of the first taper portion to gradually enlarge the refrigerant passage sectional area, and an end taper portion arranged in a range from an outlet side of the second taper portion to a refrigerant jet port to gradually enlarge the refrigerant passage sectional area. Furthermore, a second expanding angle at the outlet side of the second taper portion is larger than the first expanding angle at the outlet side of the first taper portion, and an end expanding angle at the outlet side of the end taper portion is smaller than the second expanding angle.

7 Claims, 7 Drawing Sheets

EJECTOR

CROSS REFERENCE TO RELATED APPLICATION

This application is based on Japanese Patent Application No. 2009-208948 filed on Sep. 10, 2009, the contents of which are incorporated herein by reference in its entirety.

FIELD OF THE INVENTION

The present invention relates to an ejector in which a fluid is drawn by a high-velocity jet fluid jetted from a nozzle. The ejector is suitably used for an ejector-type refrigerant cycle device.

BACKGROUND OF THE INVENTION

Conventionally, an ejector is known, in which a fluid is drawn from a fluid suction port by a suction action of a jet fluid jetted from a nozzle for decompressing and expanding the fluid to be jetted. In this kind of ejector, the velocity energy of the mixture between the jet fluid and the suction fluid drawn from the fluid suction port is converted to the pressure energy in a pressure increasing portion (e.g., diffuser portion), so that the pressure of the fluid flowing out of the ejector is increased more than the pressure of the suction fluid.

In order to sufficiently increase the pressure of the fluid in the pressure increasing portion of the ejector, it is prefer to increase the flow velocity of the jet fluid, thereby to effectively increase the flow velocity of the mixed fluid in the ejector. Thus, in a conventional ejector, there is provided with a technical means for improving an energy conversion efficiency (hereinafter, referred to as "nozzle efficiency $\eta noz$") when the pressure energy of a fluid is converted to a velocity energy of the fluid in a nozzle.

For example, Patent Document 1 (JP 11-37577A) describes regarding an ejector in which first and second throat portions (throttle portions) for reducing fluid passage sectional areas are provided in a fluid passage of a nozzle.

In the ejector of Patent Document 1, an expanding angle of a fluid passage downstream of the second throat portion is reduced near the fluid jet port, so as to restrict a generation of gas and liquid separation and a generation of a scroll flow in the fluid passage downstream of the second throat portion, thereby improving the nozzle efficiency $\eta noz$.

The nozzle efficiency $\eta noz$ is specifically defined by the following formula F1.

$$\eta noz = (Vnoz^2/2)/\Delta inoz \quad (F1)$$

Here, the Vnoz is the velocity of the jet fluid, and $\Delta inoz$ is a decrease amount of a special enthalpy when a fluid of per weight unit is decompressed and expanded in iso-entropy in the nozzle. That is, the $\Delta inoz$ is a difference of the special enthalpy between the enthalpy of the fluid at the inlet of the nozzle and the enthalpy of the fluid at the outlet of the nozzle.

In the ejector of the Patent Document 1, it is the precondition in which the fluid flowing into the first throat of the nozzle is in a liquid state. However, in the ejector of the Patent Document 1, if a gas-liquid two-phase fluid flows into the first throat of the nozzle, it is difficult to improve the nozzle efficiency. $\eta noz$.

The reasons will be described with reference to FIGS. 13A and 13B. FIG. 13A is a Mollier diagram for explaining a decompression stage of a liquid fluid decompression in the nozzle of the ejector, and FIG. 13B is a Mollier diagram for explaining a decompression stage of a gas-liquid fluid decompression in the nozzle of the ejector. In addition, in FIGS. 13A and 13B, the dashed lines show the isoentropic curved line.

The $\Delta inoz$ in the above formula F1 is a value determined by the physicality of the fluid. Thus, in order to improve the nozzle efficiency $\eta noz$, it is necessary to increase the Vnoz by decreasing the loss while the fluid is decompressed in the nozzle. Therefore, it is desirable for the fluid to be decompressed in the nozzle along the isoentropic curved line.

Furthermore, as shown in FIGS. 13A, 13B, the isoentropic curved line is an approximately S-shaped curved line, in which a decrease degree of the enthalpy becomes gradually smaller as the pressure decreases when the liquid fluid is decompressed to become in a gas-liquid two-phase state, and the decrease degree of the enthalpy becomes gradually larger as the pressure decreases when the gas-liquid two-phase fluid having a relatively small pressure is further decompressed.

In the ejector of Patent Document 1, when the liquid fluid flows into the nozzle (i.e., the first throat), the fluid is decompressed approximately along the isoentropic curved line in the entire decompression as shown in FIG. 13A even when the expanding angle of the fluid passage downstream of the second throat is made small near the fluid jet port.

In contrast, in a case where gas-liquid two-phase fluid having a relatively low pressure flows into the nozzle, it is difficult to perform a decompression stage approximately along the isoentropic curved line, as shown in FIG. 13B. As a result, when the fluid flowing into the first throat portion of the nozzle of Patent Document 1 is in the gas-liquid two-phase state, it is difficult to improve the nozzle efficiency $\eta noz$.

SUMMARY OF THE INVENTION

The inventors of the present application proposes an ejector that can provide a high nozzle efficiency $\eta noz$ even when gas-liquid two-phase fluid flows into a nozzle, as in JP. 2009-221883A (hereinafter, referred to as "prior application example"). The nozzle of the ejector of the prior application example includes a single throat portion, and an expanding angle of a fluid passage downstream of the throat portion is enlarged near the fluid jet port of the nozzle.

Thus, the passage sectional area of the fluid passage downstream of the throat portion of the nozzle can be changed (enlarged) such that the decompression of the fluid is performed along the isoentropic curved line when gas-liquid two-phase fluid flows into the nozzle. That is, the passage area of the nozzle can be enlarged to correspond to the volume expansion, even when the fluid volume is expanded by the increase of the gas ratio when the gas-liquid two-phase fluid is decompressed and expanded. Thus, the decompression stage of the fluid can be approached to the isoentropic curved line.

In the ejector of the prior application example, the nozzle efficiency $\eta noz$ can be improved when gas-liquid two-phase fluid flows into the nozzle. However, in this case, it may be difficult to sufficiently draw the fluid from the fluid suction port, and thereby the energy conversion efficiency (i.e., ejector efficiency $\eta e$) cannot be improved in the entire ejector.

The ejector efficiency $\eta e$ can be defined by the following formula F2.

$$\eta e = (1 + Ge/Gnoz) \times (\Delta P/\rho)/\Delta i \quad (F2)$$

Here, Ge is the flow amount of the suction fluid, Gnoz is the flow amount of the jet fluid, $\Delta P$ is the pressure increase amount in the diffuser portion, $\rho$ is the density of the suction fluid, and $\Delta i$ is the enthalpy difference between the nozzle inlet and the nozzle outlet.

According to the studies by the inventors of the present applicant, if the expanding angle of the fluid passage is enlarged near the fluid jet port as in the previous application example, the fluid may be injected to be expanded unnecessary in a radial direction of the nozzle. Furthermore, if the jet fluid is unnecessary expanded in the radial direction of the nozzle, the suction fluid drawn from the fluid suction port may be interrupted by the expanded jet fluid.

If the suction fluid flowing into the ejector is interrupted, the flow amount of the suction fluid is decreased, thereby decreasing the ejector efficiency $\eta e$, as being easily known from the above formula F2.

In view the above problems, it is an object of the present invention to provide an ejector which can prevent a decrease of the ejector efficiency $\eta e$ even when a fluid with a gas-liquid two-phase state flows into a nozzle in the ejector.

To achieve the above object, an ejector according to a first example of the present invention includes: a nozzle configured to decompress and expand a fluid and to jet the fluid from a fluid jet port; and a body provided with a fluid suction port from which a fluid is drawn by a high-speed jet fluid jetted from the fluid jet port, and a pressure increasing portion in which a velocity energy of a mixture fluid between the jet fluid and a suction fluid drawn from the fluid suction port is converted to a pressure energy thereof. Furthermore, an inner peripheral surface of the nozzle defining a fluid passage includes a throat portion in which a fluid passage sectional area of the fluid passage is most reduced, a first taper portion arranged downstream of the throat portion to gradually enlarge the fluid passage sectional area as toward a flow direction of the jet fluid, a second taper portion arranged downstream of the first taper portion to gradually enlarge the fluid passage sectional area as toward the flow direction of the jet fluid, and an end taper portion arranged in a range from an outlet side of the second taper portion to the fluid jet port to gradually enlarge the fluid passage sectional area as toward the flow direction of the jet fluid. In the ejector, when an axial cross section including an axial line of the nozzle is defined as a standard cross section, a second expanding angle at an outlet side of the second taper portion on the standard cross section is larger than a first expanding angle at an outlet side of the first taper portion on the standard cross section, and an end expanding angle at an outlet side of the end taper portion on the standard cross section is smaller than the second expanding angle.

Thus, the second expanding angle can be made larger than the first expanding angle, and thereby an increase degree of the fluid passage sectional area in the second taper portion becomes larger than an increase degree of the fluid passage sectional area in the first taper portion.

Therefore, in a case where gas-liquid two-phase fluid flowing into the nozzle is decompressed and expanded while passing through the throat portion, the first taper portion and the second taper portion in this order, the fluid passage area of the nozzle can be enlarged to correspond to the volume expansion, even when the fluid volume is expanded by the increase of the gas ratio.

In this case, it is possible to effectively reduce the loss due to the passage resistance when the fluid passes through the first taper portion and the second taper portion in this order. Thus, the decompression stage of the fluid in the nozzle can be approached to the decompression state along the isentropic curved line, thereby improving the nozzle efficiency.

Furthermore, because the end expanding angle at the outlet side of the end taper portion is made smaller than the second expanding angle, it can restrict the jet fluid from the fluid jet port from being unnecessary expanded in a radial direction that is perpendicular to the axial line of the nozzle. Accordingly, the suction fluid can easily flow into the interior of the ejector, and it can prevent the flow amount of the suction fluid from being decreased, thereby preventing a decrease of the ejector efficiency.

As a result, even when the fluid with a gas-liquid two-phase state flows into the nozzle, it can prevent the nozzle efficiency and the ejector efficiency $\eta e$ from being reduced in the ejector.

For example, the second taper portion may be formed into a curved line shape with a slight convex at the fluid passage side, on the standard cross section. Thus, even when the increase degree of the fluid passage sectional area of the second taper portion is smoothly changed, the decompression stage of the fluid in the nozzle can be more approached to the decompression stage of the isoentropic curved line.

Alternatively, the second taper portion may be formed into a straight line shape on the standard cross section. In this case, the second taper portion can be easily produced to reduce the product cost, while the decompression stage of the fluid in the nozzle can be further approached to the decompression, stage of the isoentropic curved line.

Furthermore, the inner peripheral surface of the nozzle defining the fluid passage may further include an introduction taper portion arranged in a range from the throat portion to, the first taper portion, to gradually enlarge the fluid passage sectional area as toward the flow direction of the jet fluid, and an introduction expanding angle at an outlet side of the introduction taper portion on the standard cross section may be larger than the first expanding angle.

When gas-liquid two-phase fluid flowing into the nozzle is decompressed and expanded while passing through the throat portion, the first taper portion and the second taper portion in this order, the gas ratio is rapidly increased at a position immediately after passing through the throat portion in the nozzle.

Because the introduction taper portion is provided such that the introduction expanding angle is made larger than the first expanding angle, the fluid passage sectional area can be enlarged to correspond to the rapid volume expansion due to a rapid increase of the gas ratio, thereby further effectively improving the nozzle efficiency.

For example, the introduction taper portion may be formed into a curved line with a convex at the radial outer side of the fluid passage of the nozzle, on the standard cross section. Thus, the increase degree of the fluid passage sectional area of the introduction taper portion can be smoothly changed, and thereby the decompression stage of the fluid in the nozzle can be more approached to the decompression stage of the isoentropic curved line.

Alternatively, the introduction taper portion may be formed into a straight line shape on the standard cross section. In this case, the introduction taper portion can be easily produced to reduce the product cost, while the decompression stage of the fluid in the nozzle can be further approached to the decompression stage of the isoentropic curved line.

Furthermore, the second expanding angle may be made equal to or larger than 1.33 times of the first expanding angle. In this case, it can further stably improve of the nozzle efficiency $\eta noz$.

According to a second example of the present invention, an ejector includes: a nozzle configured to decompress and expand a fluid and to jet the fluid from a fluid jet port; a body provided with a fluid suction port from which a fluid is drawn by a high-speed jet fluid jetted from the fluid jet port, and a pressure increasing portion in which a velocity energy of a mixture fluid between the jet fluid and a suction fluid drawn from the fluid suction port is converted to a pressure energy thereof. Furthermore, an inner peripheral surface of the nozzle defining a fluid passage includes a throat portion in which a fluid passage sectional area of the fluid passage is most reduced, a first taper portion arranged downstream of the throat portion to gradually enlarge the fluid passage sectional area as toward a flow direction of the jet fluid, a second taper portion arranged downstream of the first taper portion to gradually enlarge the fluid passage sectional area as toward the flow direction of the jet fluid, and an end taper portion arranged in a range from an outlet side of the second taper portion to the fluid jet port to gradually enlarge the fluid passage sectional area as toward the flow direction of the jet fluid. In addition, an increase degree of the fluid passage sectional area in the second taper portion is larger than an increase degree of the fluid passage sectional area in the first taper portion. When an axial cross section including an axial line of the nozzle is defined as a standard cross section, an end expanding angle at an outlet side of the end taper portion on the standard cross section is smaller than an outlet expanding angle at an outlet side of the taper portion on the standard cross section.

Thus, the increase degree of the fluid passage sectional area in the second taper portion becomes larger than the increase degree of the fluid passage sectional area in the first taper portion, thereby improving the nozzle efficiency. Furthermore, because the end expanding angle at the outlet side of the end taper portion is made smaller than the second expanding angle, it can restrict the ejector efficiency from being decreased.

As a result, even when the fluid with a gas-liquid two-phase state flows into the nozzle, it can prevent the nozzle efficiency and the ejector efficiency from being reduced.

According to a third example of the present invention, an ejector includes: a nozzle configured to decompress and expand a fluid and to jet the fluid from a fluid jet port; a needle disposed inside of the fluid passage of the nozzle to extend a fluid flow direction; and a body provided with a fluid suction port from which a fluid is drawn by a high-speed jet fluid jetted from the fluid jet port, and a pressure increasing portion in which a velocity energy of a mixture fluid between the jet fluid and a suction fluid drawn from the fluid suction port is converted to a pressure energy thereof. Furthermore, an inner peripheral surface of the nozzle defining a fluid passage includes a throat portion in which a fluid passage sectional area of the fluid passage is most reduced, an inner peripheral surface of the nozzle defining the fluid passage includes a throat portion in which a fluid passage sectional area of the fluid passage, is most reduced, a taper portion arranged downstream of the throat portion to gradually enlarge the fluid passage sectional area as toward a flow direction of the jet fluid, and an end taper portion arranged in a range from a downstream side of the taper portion to the fluid jet port to gradually enlarge the fluid passage sectional area as toward the flow direction of the jet fluid. The fluid passage, defined between an outer peripheral surface of the needle and the taper portion, includes a first expanding passage portion in which the fluid passage sectional area is gradually enlarged toward a flow direction of the jet fluid, and a second expanding passage portion arranged downstream of the first expanding passage portion to gradually enlarge the fluid passage sectional area toward the flow direction of the jet fluid. In addition, an increase degree of the fluid passage sectional area in the second expanding passage portion is larger than an increase degree of the fluid passage sectional area in the first expanding passage portion. When an axial cross section including an axial line of the nozzle is defined as a standard cross section, an end expanding angle at an outlet side of the end taper portion on the standard cross section is smaller than an outlet expanding angle at an outlet side of the taper portion on the standard cross section.

Thus, the increase degree of the fluid passage sectional area in the second expanding passage portion is larger than the increase degree of the fluid passage sectional area in the first expanding passage portion. Therefore, even when gas-liquid two-phase fluid flowing into the nozzle is decompressed and expanded while passing through the throat portion and the taper portion in this order, the passage area of the nozzle can be enlarged to correspond to an increase of the gas ratio. Accordingly, it can further improve the nozzle efficiency $\eta noz$.

Furthermore, because the end expanding angle is made smaller than the second expanding angle, it can restrict a decrease of the ejector efficiency. As a result, even when the fluid with a gas-liquid two-phase state flows into the nozzle, it can prevent the nozzle efficiency and the ejector efficiency $\eta e$ from being reduced in the ejector.

For example, first and second passage expanding portions may be formed in a fluid passage between the inner peripheral surface of the taper portion of the nozzle and the outer peripheral surface of the needle. In this case, an increase degree of the fluid passage sectional area in the second expanding passage portion may be larger than an increase degree of the fluid passage sectional area in the first expanding passage portion, and the taper portion may be configured by a first taper portion provided downstream of the throat portion, and a second taper portion provided downstream of the first taper portion. Furthermore, a second expanding angle at an outlet side of the second taper portion on the standard cross section may be larger than a first expanding angle at an outlet side of the first taper portion on the standard cross section, and an outer peripheral surface of the needle, positioned radially inside of the taper portion, may be formed into a straight line shape on the standard cross section.

Alternatively, the taper portion may be formed into a straight line shape on the standard cross section. Furthermore, the needle, positioned radially inside of the taper portion, may include a first reduction portion in which the sectional area is gradually reduced toward a flow direction of the jet fluid, and a second reduction portion arranged downstream of the first reduction portion to gradually reduce the sectional area toward the flow direction of the jet fluid. In this case, a reduction degree of the sectional area of the first reduction portion may be smaller than a reduction degree of the sectional area of the second reduction portion.

Alternatively, the taper portion may be configured by a first taper portion provided downstream of the throat portion, and a second taper portion provided downstream of the first taper portion. Furthermore, the needle, positioned radially, inside of the first taper portion defining the first expanding passage portion, may include a first reduction portion in which the sectional area is gradually reduced toward a flow direction of the jet fluid. In this case, the needle, positioned radially inside of the second taper portion defining the second expanding passage portion, may include a second reduction portion in which the sectional area is gradually reduced toward a flow direction of the jet fluid.

Furthermore, the inner peripheral surface of the nozzle may further include an introduction taper portion arranged in a range from the throat portion to the taper portion, to gradually enlarge the fluid passage sectional area as toward the flow direction of the jet fluid. In this case, an introduction expanding angle at an outlet side of the introduction taper portion on the standard cross section is larger than the first expanding angle.

In this case, the fluid passage sectional area can be enlarged to correspond to the rapid volume expansion due to a rapid increase of the gas ratio immediately after passing through the throat portion, thereby further effectively improving the nozzle efficiency.

BRIEF DESCRIPTION OF THE DRAWINGS

Additional objects and advantages of the present invention will be more readily apparent from the following detailed description of preferred embodiments when taken together with the accompanying drawings. In which.

EMBODIMENTS (First Embodiment)

A first embodiment of the invention will be described below with reference to FIGS. 1 to 4. In the present embodiment, an ejector 16 of the invention is typically applied to an ejector-type refrigerant cycle device 10 of an air conditioner for a vehicle.

Figure 1:
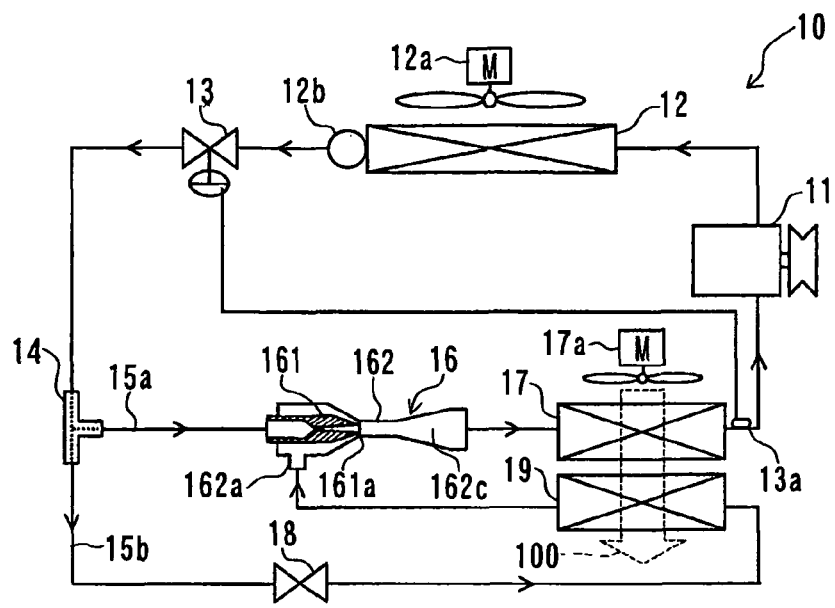
FIG. 1 is an entire schematic diagram of an ejector-type refrigerant cycle device according to a first embodiment of the invention.

FIG. 1 is an entire schematic diagram of the ejector-type refrigerant cycle device 10 of the present embodiment. In the ejector-type refrigerant cycle device 10, the compressor 11 is configured to draw refrigerant and to compress the drawn refrigerant. The compressor 11 is rotated, and driven by a drive force from an engine (not shown) for a vehicle traveling.

As the compressor 11, a variable capacity compressor or a fixed displacement compressor may be used. The variable capacity compressor is adapted to adjust a refrigerant discharge capacity by changing refrigerant discharge amount. Furthermore, the fixed displacement compressor is adapted to adjust a refrigerant discharge capacity by changing an operation rate of the compressor using interruption of the electromagnetic clutch. When an electrical compressor is used as the compressor 11, the refrigerant discharge capacity of the compressor 11 can be adjusted by adjusting the rotational speed of the electrical motor.

A refrigerant radiator 12 is connected to a refrigerant discharge side of the compressor 11. The radiator 12 is a heat-radiation heat exchanger in which high-pressure refrigerant discharged from the compressor 11 is heat-exchanged with outside air (i.e., air outside of the vehicle compartment) blown by a cooling fan 12a, thereby cooling the high-pressure refrigerant. The cooling fan 12a is an electrical blower in which the rotational speed (air blowing amount) is controlled by a control voltage output from an air conditioning controller (not shown).

In the ejector-type refrigerant cycle device 10 of the present embodiment, a Freon-based refrigerant may be used. In this case, the ejector-type refrigerant cycle device 10 is configured to form a sub-critical refrigerant cycle, in which the refrigerant pressure of the high-pressure side does not higher than the critical pressure of the refrigerant. Thus, the radiator 12 is adapted as a condenser in which refrigerant is condensed. In the present embodiment, the refrigerant is one example of a fluid.

A receiver 12b is connected to a refrigerant outlet side of the radiator 12. The receiver 12b is a gas-liquid separator, in which the refrigerant flowing out of the radiator 12 is separated into gas refrigerant and liquid refrigerant, and the surplus liquid refrigerant is stored in the receiver 12b. In the present embodiment, the radiator and the receiver 12b are configured integrally; however, the radiator 12 and the receiver 12b may be configured separately from each other.

Furthermore, as the radiator 12, a sub-cool type condenser may be used to include a condensation heat exchanging portion for cooling and condensing the refrigerant, a receiver portion in which the refrigerant introduced from the condensation heat exchanging portion is separated into gas refrigerant and liquid refrigerant, and a super-cooling heat exchanging portion in which the saturated liquid refrigerant from the receiver portion is super-cooled.

An expansion valve 13 as a variable throttle mechanism is connected to a liquid refrigerant outlet of the receiver 12b. The expansion valve 13 is adapted as a decompression means for decompressing the high-pressure liquid refrigerant flowing out of the receiver 12b into a middle pressure refrigerant of a gas-liquid two-phase state, and is also adapted as a flow adjusting means for adjusting a flow amount of the refrigerant to flow toward downstream of the expansion valve 13.

In the present embodiment, a thermal expansion valve is used as the expansion valve 13. Specifically, the thermal expansion valve has a temperature sensing portion 13a arranged in a refrigerant passage at a refrigerant outlet side of a discharge side evaporator 17 described later. The thermal expansion valve 13 is a variable throttle mechanism, in which a super-heat degree of the refrigerant at the refrigerant outlet side of the discharge side evaporator 17 is detected based on temperature and pressure of the refrigerant at the refrigerant outlet side of the discharge side evaporator 17, and its valve-open degree (refrigerant flow amount) is adjusted by using a mechanical mechanism so that the super-heat degree of the refrigerant at the refrigerant outlet side of the discharge side evaporator 17 is approached to a predetermined value.

A branch portion 14 is connected to a refrigerant outlet side of the expansion valve 13, to branch the flow of a gas-liquid middle-pressure refrigerant decompressed and expanded by the expansion valve 13 into two streams. For example, the branch portion 14 is a three-way joint structure having three ports that are used as one refrigerant inlet and two refrigerant outlets. The branch portion 14 may be configured by bonding plural pipes, or may be configured by providing plural refrigerant passages in a metal block member or a resin block member.

One refrigerant branched in the branch portion 14 flows into a nozzle side pipe 15a that connects one refrigerant outlet of the branch portion 14 and the inlet of the nozzle 161 of the ejector 16 with each other. The other refrigerant branched in the branch portion 14 flows into a suction side pipe 15b that connects the other refrigerant outlet of the branch portion 14 and a refrigerant suction port 162a of the ejector 16 with each other.

Figure 2:
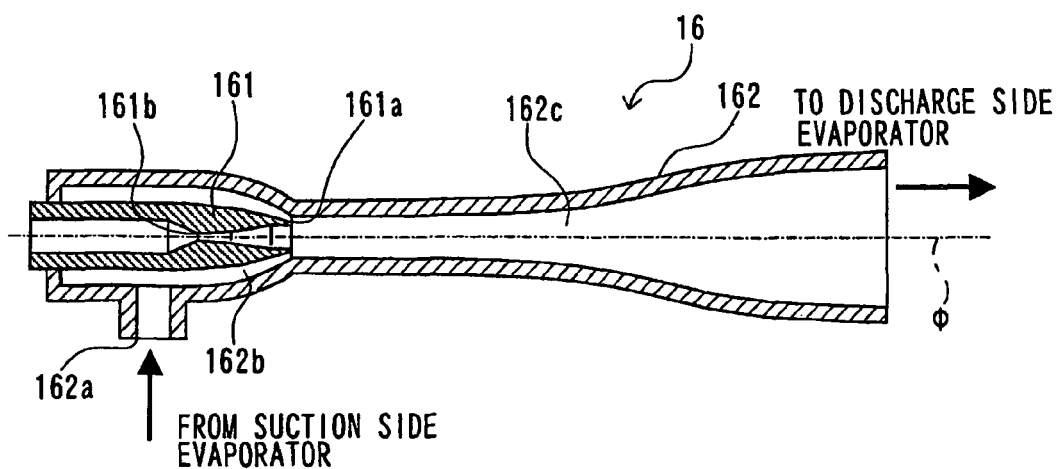
FIG. 2 is an axial sectional view showing an ejector according to the first embodiment.
Figure 3:
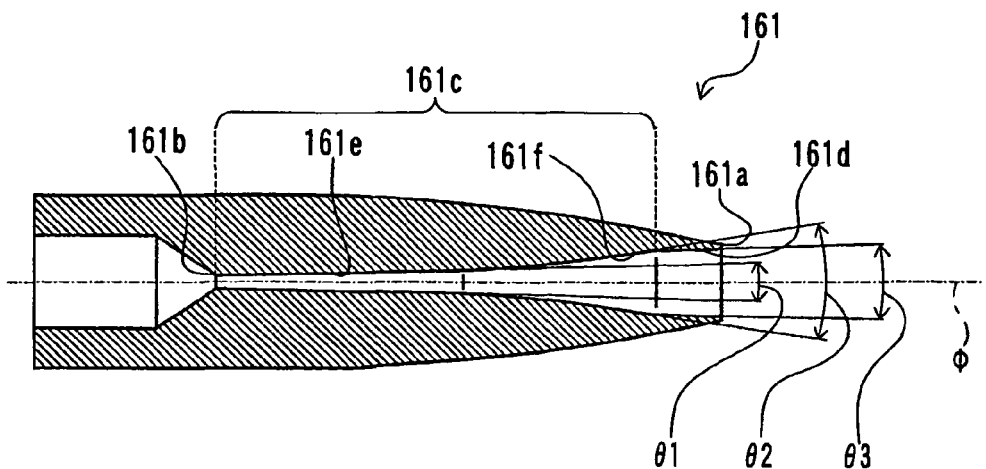
FIG. 3 is an enlarged sectional view showing a nozzle according to the first embodiment.

The ejector 16 is adapted as a refrigerant decompression means for decompressing and expanding a high-pressure refrigerant, and as a refrigerant circulation means for circulating the refrigerant by the suction action of a high-speed refrigerant flow jetted from the nozzle 161. A detail structure of the ejector 16 will be described with reference to FIGS. 2 and 3. FIG. 2 is an axial sectional view including an axial line φ of the nozzle 161 of the ejector 16, and FIG. 3 is an enlarged sectional view showing the nozzle 161 of FIG. 2. The cross section of the nozzle 161 shown in FIGS. 2 and 3 is the basic section thereof.

The ejector 16 of the embodiment is configured to have the nozzle 161 and a body 162. First, the nozzle 161 is formed from an approximately cylindrical member made of a metal (for example, brass, a stainless alloy). As shown in FIG. 3, the nozzle 161 is formed in a taper shape tapered toward in a refrigerant flow direction. In the interior of the nozzle 161, a refrigerant passage (i.e., fluid passage), through which the refrigerant flowing from the nozzle side pipe 15a flows, is formed along the axial line φ.

The refrigerant passage of the nozzle 161 is formed and defined by an inner peripheral surface of the nozzle 161. By suitably changing a radial dimension of the refrigerant passage the nozzle 161, the refrigerant passage sectional area (fluid passage sectional area) of the refrigerant passage of the nozzle 161 can be suitably changed. Thus, the refrigerant passage of the nozzle 161 is configured by combining plural cylindrical spaces arranged on the same axial line, or/and plural corn spaces arranged on the same axial line.

More specifically, the inner peripheral surface of the nozzle 161 is provided with a refrigerant jet port (fluid jet port) 161a, a throat portion 161b and a taper portion 161c. The refrigerant jet port 161a is provided at the most downstream portion in the refrigerant passage of the nozzle 161, such that the refrigerant is jetted from the refrigerant jet port 161a. The throat portion 161b is the most throttled portion in the refrigerant passage sectional area, and is provided in a middle portion of the refrigerant passage of the nozzle 161. The taper portion 161c is provided in the nozzle 161 downstream of the throat portion 161b in the refrigerant flow.

In the present embodiment, the nozzle 161 is configured as in a Laval nozzle, such that the refrigerant flowing into the nozzle 161 is decompressed and expanded in iso-entropy thereby accelerating the flow speed of the refrigerant jetted from the refrigerant jet port 161a to the sound speed.

Furthermore, an end taper portion 161d is provided in the inner peripheral surface of the nozzle 161, in an end portion adjacent to the refrigerant jet port 161a of the refrigerant passage. That is, the end taper portion 161d is provided in a range from an outlet side of the taper portion 161c to the refrigerant jet port 161a such that the refrigerant passage area is gradually increased as toward the refrigerant flow direction.

The taper portion 161c is divided into first and second taper portions 161e, 161f. When an expanding angle of an outlet side of the first taper portion 161e on the standard cross section is a first expanding angle θ1, when an expanding angle of an outlet side of the second taper portion 161f on the standard cross section is a second expanding angle θ2, and when an expanding angle of an outlet side of the end taper portion 161d on the standard cross section is an end expanding angle θ3, the expanding angles θ1, θ2, θ3 are set to satisfy the following formulas F3 and F4.

$$\theta 1 < \theta 2 \tag{F3}$$

$$\theta 2 > \theta 3 \tag{F4}$$

That is, the second expanding angle θ2 is larger than the first expanding angle θ1, and the end expanding angle θ3 is smaller than the second expanding angle θ2. Specifically, in the present embodiment, the second expanding angle θ2 is made equal to or larger than 1.33 of the first expanding angle θ1. More specifically, the second expanding angle θ2 is made approximately in a range from 1.4 to 2.0 times of the first expanding angle θ1 (i.e., θ2/θ1=1.4-2.0).

That is, an increase degree of the refrigerant passage sectional area of the second taper portion 161f is made larger than an increase degree of the refrigerant passage sectional area of the first taper portion 161e, and an increase degree of the refrigerant passage sectional area of the end taper portion 161d is made smaller than an increase degree of the refrigerant passage sectional area of the second taper portion 161f.

The first taper portion 161e and the second taper portion 161f are smoothly connected at a connection portion by chamfering, and the second taper portion 161f and the end taper portion 161d are smoothly connected at a connection portion by chamfering. Thus, it can prevent the refrigerant passage sectional area from being rapidly restricted at the respective connection portion, thereby reducing the loss of the kinetic energy of the refrigerant.

The first expanding angle θ1 at the outlet side of the first taper portion 161e is the expanding angle at the most downstream side of the first taper portion 161e except for the chamfering portion. That is, the first expanding angle θ1 is the angle defined by the tangential lines at the most downstream portion of the first taper portion 161e on the standard cross section. The second expanding angle θ2 and the end expanding angle θ3 are also defined similar to the first expanding angle θ1.

Furthermore, in the present embodiment, the first taper portion 161e and the end taper portion 161d are formed into a line shape on the standard cross section, and the second taper portion 161f is formed into a curved line with a convex at the radial inner side of the refrigerant passage on the standard cross section.

The nozzle 161 is received in the interior of the body 162 and is fixed to the body 162 by fitting or the like, thereby preventing the refrigerant from leaking from the fitted portion (fixing portion) of the nozzle 161. If a refrigerant leakage from the fixing portion of the nozzle 161 can be prevented, the nozzle 161 may be bonded and fixed to the body 162 by using a connection means such as an adhesion, a welding, press-fitting, soldering and the like.

The body 162 is formed from an approximately cylindrical metal (e.g., aluminum). The body 162 is adapted as a fixing member for supporting and fixing the nozzle 161 therein, and defines an outer shell of the ejector 16. The body 162 may be made of a resin, if the above function can be obtained in the body 162. The body 162 is, provided with a refrigerant suction port (i.e., fluid suction port) 162a, a suction passage 162b, a diffuser portion 162c as the pressure increasing portion; and the like.

The refrigerant suction port 162a is a through hole provided to penetrate through the interior and the exterior of the body 162. The refrigerant suction port 162a is provided such that the refrigerant flowing out of the suction side evaporator 19 is drawn into the ejector 16, by a suction action caused due to a pressure decease of the injection refrigerant. The refrigerant suction port 162a is positioned at an outer peripheral side of the nozzle 161, and is made to communicate with the refrigerant jet port 161a via the suction passage 162b.

Thus, an inlet space for introducing the refrigerant therein is formed near the refrigerant suction port 162a in the body 162, and the suction passage 162b is formed in a space between an outer peripheral surface of the tapered end portion of the nozzle 161 and an inner peripheral surface of the body 162 so as to introduce the suction refrigerant flowing into the interior of the body 162 to the diffuser portion 162c.

In the present embodiment, the refrigerant passage area of the suction passage 162b is changed to be gradually reduced toward the downstream of the refrigerant flow, so that the flow speed of the suction refrigerant flowing through the suction passage 162b is increased to be approached to the flow speed of the jet refrigerant.

The diffuser portion 162c is configured to mix the jet refrigerant jetted from the nozzle 161 and the suction refrigerant drawn from the refrigerant suction port 162a, and to convert the kinetic energy of mixed gas-liquid two-phase refrigerant to the pressure energy. Specifically, the diffuser portion 162c is formed to have a refrigerant passage in which the refrigerant passage section area is gradually enlarged toward the refrigerant flow direction, thereby increasing the refrigerant, pressure by decelerating the refrigerant flow.

Furthermore, the refrigerant passage of the diffuser portion 162c is shaped, such that the expanding degree of the refrigerant passage sectional area of the diffuser portion 162c at its inlet side is changed larger than the expanding degree of the refrigerant passage sectional area of the diffuser portion 162c at its outlet side. That is, at the inlet side of the diffuser portion 162c, the refrigerant passage sectional area is rapidly expanded than the average expanding degree from the inlet to the outlet of the diffuser portion 162c. In contrast, at the outlet side of the diffuser portion 162c, the refrigerant passage sectional area is gradually expanded than the average expanding degree from the inlet to the outlet of the diffuser portion 162c.

On the standard cross section that is the section including the axial line φ, the sectional shape of the inlet side refrigerant passage of the diffuser portion 162c is formed in a curved line curved in a convex toward the inner peripheral side, and the sectional shape of the outlet side refrigerant passage of the diffuser portion 162c is formed in a curved line curved in a convex toward the outer peripheral side. Thus, it can restrict a separation of the refrigerant in the outlet portion of the diffuser portion 162c, thereby reducing the loss of the energy contained in the refrigerant.

The discharge side evaporator 17 is located downstream of the diffuser portion 162c of the ejector 162, as, shown in FIG. 1. The discharge side evaporator 17 is a heat-absorbing heat exchanger, in which the refrigerant flowing out of the diffuser portion 162c is heat-exchanged with air blown by a blower fan 17a, thereby evaporating the refrigerant to have heat absorbing action.

The blower fan 17a is an electrical blower in which the rotational speed (air blowing amount) is controlled by a control voltage output from the air conditioning controller. The refrigerant outlet of the discharge side evaporator 17 is coupled to a refrigerant suction port of the compressor 11.

The suction side pipe 15b, in which the other refrigerant branched in the branch portion 14 flows, is connected to the refrigerant suction port 162a of the ejector 16 via a throttle mechanism 18 and a suction side evaporator 19. The throttle mechanism 18 is adapted as a decompression means for decompressing the refrigerant to flow into the suction side evaporator 19, and is also adapted as a flow adjusting means for adjusting a flow amount of the refrigerant to flow into the suction side evaporator 19. As the throttle mechanism 18, a fixed throttle such as a capillary tube, an orifice or the like can be used.

The suction side evaporator 19 is configured to perform heat exchange between the refrigerant flowing out of the throttle mechanism 18 and air blown by the blower fan 17a and having passed through the discharge side evaporator 17, and is adapted as a heat-absorbing heat exchanger in which the refrigerant is evaporated so as to exert heat-absorbing action. The refrigerant outlet of the suction side evaporator 19 is coupled to the refrigerant suction port 162a of the ejector 162.

In the present embodiment, both the discharge side evaporator 17 and the suction side evaporator 19 are integrally assembled to each other. The air blown by the blower fan 17a flows as in the arrow 100. Thus, the air blown by the blower fan 15a is cooled at first in the discharge side evaporator 17, and is further cooled in the suction side evaporator 19, and then flows into a space to be cooled (e.g., vehicle compartment). Thus, in the present embodiment, the same space to be cooled (e.g., vehicle compartment) can be cooled by using both the discharge side evaporator 17 and the suction side evaporator 19.

Next, operation of the above-described ejector-type refrigerant cycle device 10 of the present embodiment will be described. When the compressor 11 is driven by a vehicle engine, high-temperature and high-pressure refrigerant discharged from the compressor 11 flows into the radiator 12. The radiator 12 is configured to cool and condense the high-temperature refrigerant by using outside air. The high-pressure refrigerant flowing out of radiator 12 flows into the receiver 12b, and is separated into gas refrigerant and liquid refrigerant in the receiver 12b.

The separated liquid refrigerant flowing out of the receiver 12b flows into the expansion valve 13, and is decompressed and expanded in the expansion valve 13 to a middle pressure of a gas-liquid two-phase state. Thereafter, the decompressed and expanded refrigerant flowing out of the expansion valve 13 flows into the branch portion 14. At this time, the expansion valve 13 adjusts the flow amount of the refrigerant flowing toward downstream so that a super-heating degree of the refrigerant at the outlet side of the discharge side evaporator 17 is approached to the predetermined value.

The refrigerant decompressed and expanded by the expansion valve 13 flows into the branch portion 14, and is branched by the branch portion 14 into a flow of the refrigerant flowing into the nozzle side pipe 15a and a flow of the refrigerant flowing into the suction side pipe 15b. At this time, a flow ratio Gnoz/Ge of a refrigerant flow amount Gnoz flowing into the nozzle side pipe 15a to a refrigerant flow amount Ge flowing into the suction side pipe 15b is determined by using flow characteristics (pressure loss characteristics) of the nozzle 161 and the throttle mechanism 18, thereby obtaining a high coefficient of performance (COP) in the entire cycle.

The middle pressure refrigerant of gas-liquid two-phase state flowing into the ejector 16 via the nozzle side pipe 15a is further decompressed by the nozzle 161. At this time, the pressure energy of the refrigerant is converted to the speed energy of the refrigerant in the nozzle 161, and gas-liquid refrigerant is jetted with a high speed from the refrigerant jet port 161a of the nozzle 161. Thus, the gas refrigerant evaporated in the suction side evaporator 19 is drawn into the ejector 16 from the refrigerant suction port 162a by the high-speed refrigerant jetted from the refrigerant jet port 161a.

Furthermore, the jet refrigerant jetted from the nozzle 161 and the suction refrigerant drawn from the refrigerant suction port 162a flow into the diffuser portion 162c of the ejector 16. In the diffuser portion 162c, the jet refrigerant and the suction refrigerant are mixed. Furthermore, the passage sectional area is enlarged in the diffuser portion 162c as toward downstream so that the speed energy of the refrigerant is converted to the pressure energy thereof, thereby increasing the pressure of the refrigerant.

The refrigerant flowing out of the diffuser portion 162c of the ejector 16 flows into the discharge side evaporator 17. In the discharge side evaporator 17, the low-pressure refrigerant flowing therein is evaporated by absorbing heat from air blown by the blower fan 17a. Therefore, air blown by the blower fan 17a can be cooled by the discharge side evaporator 17. The gas refrigerant flowing out of the discharge side evaporator 17 is drawn into the compressor 11, and is compressed again.

The refrigerant flowing into the suction side pipe 15b is decompressed and expanded by the throttle mechanism 18 to become a low-pressure refrigerant, and the low-pressure refrigerant flows into the suction side evaporator 19. In the suction side evaporator 19, the low-pressure refrigerant flowing therein is evaporated by absorbing heat from air blown by the blower fan 17a and having passed through the discharge side evaporator 17.

Therefore, air blown by the blower fan 17a is further cooled by the discharge side evaporator 19, and then is blown into the vehicle compartment. The gas refrigerant flowing out of the suction side evaporator 19 is drawn into the ejector 16 from the refrigerant suction port 162a, as described above.

In the ejector-type refrigerant cycle device 10 of the present embodiment, the refrigerant flowing out of the diffuser portion 162c of the ejector 16 is supplied to the discharge side evaporator 17, and the refrigerant flowing into the suction side pipe 15b is supplied to the suction side evaporator 19 via the throttle mechanism 18. Thus, cooling action can be obtained in both the discharge side evaporator 17 and the suction side evaporator 19, at the same time.

The air blown by the blower fan 17a flows as in the arrow 100. Thus, the air blown by the blower fan 17a passes through the discharge side evaporator 17 and the suction side evaporator 19 in this order, and then flows into the same space to be cooled. By the pressurizing action of the diffuser portion 162c, the refrigerant evaporation temperature of the suction side evaporator 19 can be made lower than that of the refrigerant evaporation temperature of the discharge side evaporator 17. Thus, a temperature difference between the blown air and the refrigerant evaporation temperature can be secured in both the discharge side evaporator 17 and the suction side evaporator 19, thereby effectively cooling the blown air.

Because the downstream side of the discharge side evaporator 17 is connected to the refrigerant suction side of the compressor 11, the refrigerant pressurized in the diffuser portion 162c can be drawn into the compressor 11. Therefore, the suction pressure of the refrigerant of the compressor 11 can be increased, and the drive power of the compressor 11 can be reduced. Thus, the COP can be effectively improved in the entire cycle of the ejector-type refrigerant cycle device 10.

Furthermore, in the present embodiment, since the above-mentioned ejector 16 is adopted, ejector efficiency be can be improved, and thereby the COP can be improved effectively. That is, in the ejector 16 of the present embodiment, the taper portion 161c defining the refrigerant passage of the nozzle 161 is divided into the first and second taper portions 161e, 161f.

Furthermore, the increase decree of the refrigerant passage sectional area in the second taper portion 161f is made larger than the increase degree of the refrigerant passage sectional area in the first taper portion 161e, such that the first expanding angle $\theta 1$ at the outlet side of the first taper portion 161e on the standard cross section and the second expanding angle $\theta 2$ at the outlet side of the second taper portion 161f on the standard cross section are made to satisfy the relationship of the formula F3.

Thus, even when gas-liquid two-phase refrigerant flowing into the nozzle 161 is decompressed and expanded while passing through the first taper portion 161e and the second taper portion 161f in this order, the refrigerant passage area of the nozzle 161 can be enlarged to correspond to the volume expansion, even when the fluid volume is expanded by the increase of the gas ratio.

In this case, it is possible to effectively reduce the loss due to the passage resistance when the refrigerant passes through the first taper portion 161e and the second taper portion 161f in this order. Thus, the decompression stage of the refrigerant in the nozzle 161 can be approached to the isoentropic curved line, thereby improving the nozzle efficiency $\eta noz$.

Furthermore, the end expanding angle $\theta 3$ at the outlet side of the end taper portion 161d on the standard cross section and the second expanding angle $\theta 2$ are set to satisfy the relationship of the formula F4, thereby restricting the jet refrigerant jetted from the refrigerant jet port 161a from being unnecessary expanded in a radial direction that is perpendicular to the axial line $\phi$.

The suction refrigerant drawn into the ejector 16 from the refrigerant suction port 162a easily flows into the inside of the ejector 16, and thereby it can restrict the flow amount Ge of the suction refrigerant is not reduced. As a result, even when the refrigerant with a gas-liquid two-phase state flows into the nozzle 161, it can prevent the nozzle efficiency $\eta noz$ and the ejector efficiency $\eta e$ from being reduced, thereby effectively improving the COP.

Furthermore, in the ejector 16 of the present embodiment, the second taper portion 161f is formed into a curved line with a slight convex at the inside side of the refrigerant passage on the standard cross section. Thus, even when the increase degree of the refrigerant passage sectional area of the second taper portion 161f is smoothly changed, the decompression stage of the refrigerant in the nozzle 161 can be further approached to the decompression stage of the isoentropic curved line. Therefore, it can effectively prevent a decrease of the nozzle efficiency $\eta noz$.

In the present embodiment, the second taper portion 161f may be formed into a straight line shape on the standard cross section. Even in this case, the second taper portion 161f can be easily produced to reduce the product cost, while the decompression stage of the refrigerant in the nozzle 161 can be approached to the decompression stage of the isoentropic curved line to prevent a decrease of the nozzle efficiency $\eta noz$.

Figure 4:
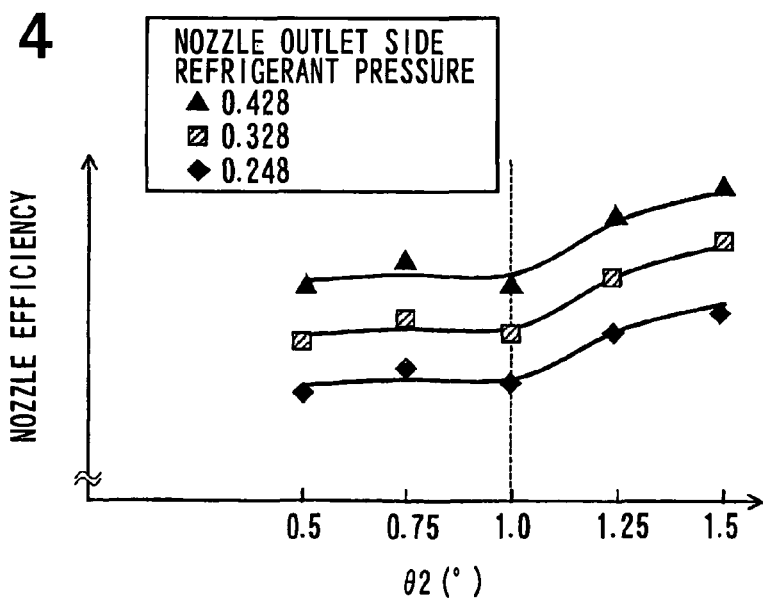
FIG. 4 is a graph showing the relationship between a second expanding angle $\theta 2$ and a nozzle efficiency $\eta noz$.

Furthermore, in the present embodiment, because the second expanding angle $\theta 2$ is made equal to or larger than 1.33 times of the first expanding angle $\theta 1$ (i.e., $\theta 2/\theta 1 \geq 1.33$), the nozzle efficiency $\eta noz$ can be stably improved. The detail will be described with reference to FIG. 4. FIG. 4 is a graph showing the relationship between the second expanding angle θ2 and the nozzle efficiency ηnoz.

More specifically, in FIG. 4, the relationships between the second expanding angle θ2 and the nozzle efficiency ηnoz are estimated, when gas-liquid refrigerant having a predetermined different pressures flows into the nozzle 161 in a case where the nozzle 161 with the first expanding angle θ1 of 0.75 degree (°) is used. Furthermore, the discharge side refrigerant pressure of the nozzle 161 is changed to in a range of 0.248 MPa-0.428 MPa.

As shown in FIG. 4, when the second expanding angle θ2 is in a range of 0.5° to 1°, the nozzle efficiency is approximately equal regardless of the refrigerant pressure at the refrigerant outlet side of the nozzle 161. However, when the second expanding angle θ2 is equal to or larger than 1 (i.e., θ2/θ1≧1.33), the nozzle efficiency can be increased.

As a result, in the present embodiment, even when the refrigerant with a gas-liquid two-phase state flows into the nozzle 161, it can prevent the nozzle efficiency ηnoz and the ejector efficiency ηe in the entire cycle from being reduced. Furthermore, in the present embodiment, since the above-mentioned ejector 16 is used for the ejector-type refrigerant cycle device 10, the COP can be improved effectively in the ejector-type refrigerant cycle device 10.

(Second Embodiment)

Figure 5:
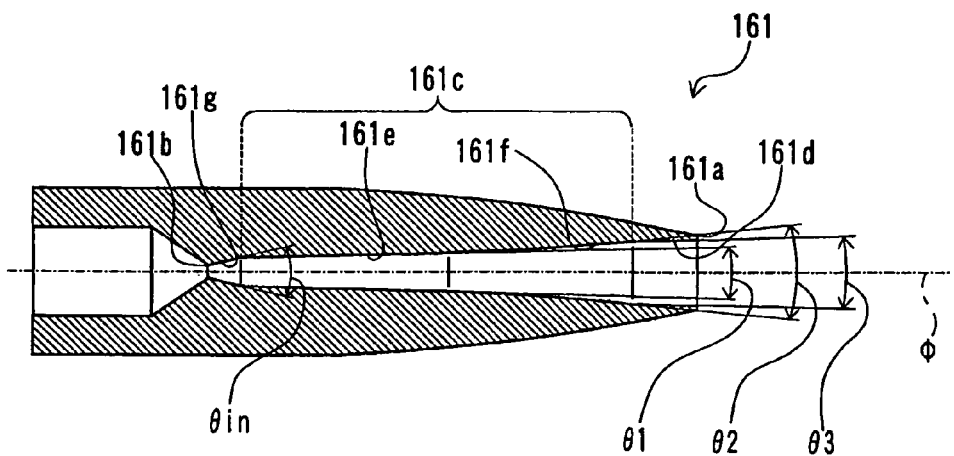
FIG. 5 is an enlarged sectional view showing a nozzle according to a second embodiment of the invention.

A second embodiment of the present invention will be described with reference to FIG. 5. In the present embodiment, as shown in FIG. 5, an introduction taper portion 161g is provided additionally with respect to the nozzle 161 of the above-described first embodiment. The introduction taper portion 161g is provided in the inner peripheral surface defining the refrigerant passage of the nozzle 161 in a range from the throat portion 161b to the first taper portion 161e in the refrigerant flow direction, such that the refrigerant passage sectional area is gradually increased as toward the refrigerant flow direction.

FIG. 5 is an enlarged sectional view of the nozzle 161 of the present embodiment, and is a drawing corresponding to FIG. 3 of the above-described first embodiment. In FIG. 5, parts similar to or corresponding to those of the first embodiment are indicated by the same reference numbers. This is the same also in the following drawings.

The introduction taper portion 161g is formed to satisfy the following formula F5, when an expanding angle at the outlet side of the introduction taper portion 161g on the standard cross section is θin.

$$\theta in > \theta 1 \quad (F5)$$

That is, the introduction expanding angle θin is made larger than the first expanding angle θ1. Thus, the increase degree of the refrigerant passage sectional area in the introduction taper portion 161g is larger than the increase degree of the refrigerant passage sectional area in the first taper portion 161e.

Furthermore, in the present embodiment, the introduction taper portion 161g is formed into a curved line with a slight convex at the radial outer side of the refrigerant passage of the nozzle 161 on the standard cross section. The introduction taper portion 161g and the first taper portion 161e are smoothly connected at a connection portion by round-chamfering, similarly to the other connection portion of the first embodiment.

Other configurations and operation of the present embodiment are similar to those of the above-described first embodiment. Thus, in the present embodiment, even when the refrigerant with a gas-liquid two-phase state flows into the nozzle 161 of the ejector 16, it can prevent the nozzle efficiency ηnoz and the ejector efficiency ηe in the entire ejector 16 from being reduced, similarly to the above-described first embodiment.

Furthermore, in the present embodiment, the introduction expanding angle θin and the first expanding angle θ1 are set to satisfy the relationship of the formula F5, thereby further effectively improving the nozzle efficiency ηnoz.

When gas-liquid two-phase refrigerant flowing into the nozzle 161 is decompressed and expanded while passing through the throat portion 161b, the introduction taper portion 161g, the first taper portion 161e and the second taper portion 161f in this order, the gas ratio is rapidly increased at a position immediately after passing through the throat portion 161b in the nozzle 161.

In the present embodiment, because the introduction taper portion 161g is provided such that the introduction expanding angle θin is made larger than the first expanding angle θ1, the refrigerant passage sectional area can be enlarged to correspond to the rapid volume expansion due to a rapid increase of the gas ratio, thereby further effectively improving the nozzle efficiency ηnoz.

Furthermore, in the ejector 16 of the present embodiment, the introduction taper portion 161g is formed into a curved line with a slight convex on the radial outer side of the refrigerant passage on the standard cross section. Thus, the increase degree of the refrigerant passage sectional area of the introduction taper portion 161g is smoothly changed, and thereby the decompression stage of the refrigerant in the nozzle 161 can be more approached to the decompression stage of the isoentropic curved line. Therefore, it can further prevent a decrease of the nozzle efficiency ηnoz.

In the present embodiment, the introduction taper portion 161g may be formed into a straight line shape on the standard cross section. In this case, the introduction taper portion 161g can be easily produced to reduce the product cost, while the decompression stage of the refrigerant in the nozzle 161 can be approached to the decompression stage of the isoentropic curved line to prevent a decrease of the nozzle efficiency ηnoz.

(Third Embodiment)

Figure 6:
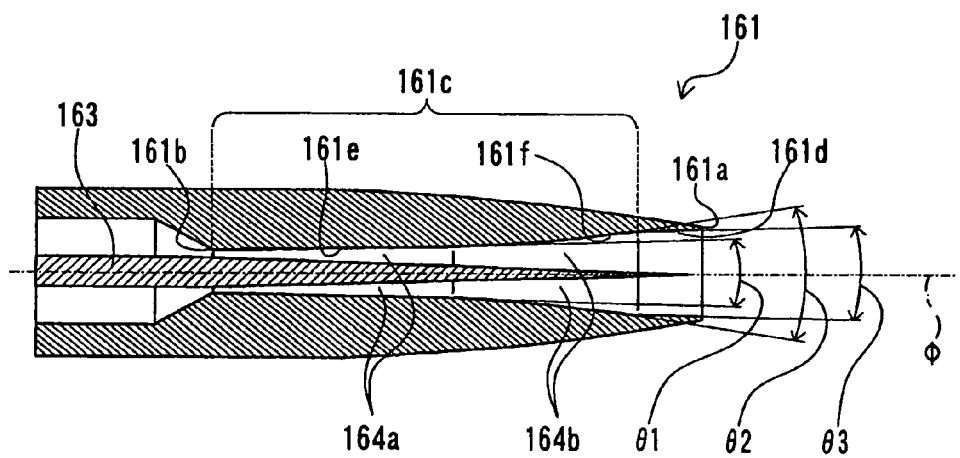
FIG. 6 is an enlarged sectional view showing a nozzle according to a third embodiment of the invention.

In the present embodiment, as shown in FIG. 6, a needle 163 is arranged in the refrigerant passage of the nozzle 161, with respect to the above-described first embodiment.

The needle 163 is arranged in the refrigerant passage of the nozzle 161 to extend coaxially with the axial line φ, and is formed into a needle shape in which the sectional area perpendicular to the axial direction is gradually reduced as toward the refrigerant flow direction. Thus, in the nozzle 161 of the present embodiment, a refrigerant passage having a circular-ring shape in cross-section (e.g., a doughnut-like shape) is formed between the outer peripheral surface of the needle 163 and the inner peripheral surface of the nozzle 161 that is configured similarly to the above described first embodiment.

Furthermore, on the standard cross section of the nozzle 161, the outer peripheral surface of the needle 163 is formed into a straight line in a range positioned radial inside of the taper portion 161c of the nozzle 161. In the nozzle 161 of the present embodiment, the taper portion 161c is divided into first and second taper portions 161e, 161f, similarly to the first embodiment. Thus, even in the present embodiment, the first expanding angle θ1 and the second expanding angle θ2 satisfy the above formula F3, such that the second expanding angle θ2 is larger than the first expanding angle θ1.

The refrigerant passage, formed between the outer peripheral surface of the needle 163 and the inner peripheral surface of the nozzle 161, includes a first expanding passage portion 164*a* and a second expanding passage portion 164*b* arranged downstream of the first expanding passage portion 164*a*. In the first expanding passage portion 164*a*, the refrigerant passage sectional area is gradually enlarged toward the refrigerant flow direction in the range corresponding to the first taper portion 161*e*. Furthermore, in the second expanding passage portion 164*b*, the refrigerant passage sectional area is gradually enlarged toward the refrigerant flow direction in the range corresponding to the second taper portion 161*f*.

Thus, the increase degree of the refrigerant passage sectional area in the second expanding passage portion 164*b* is larger than the increase degree of the refrigerant passage sectional area in the first expanding passage portion 164*a*. Accordingly, in the present embodiment, the refrigerant passage sectional area of the circular-ring shaped refrigerant passage of the nozzle 161 is changed in a range from the throat portion 161*b* to the refrigerant jet port 161*a*, similarly to the change in the refrigerant passage sectional area of the nozzle 161 of the above-described first embodiment.

Other configurations and operation of the present embodiment are similar to those of the above-described first embodiment. Thus, in the ejector of the present embodiment, even when the refrigerant with a gas-liquid two-phase state flows into the nozzle 161 of the ejector 16, it can prevent the nozzle efficiency ηnoz and the ejector efficiency ηe in the entire ejector 16 from being reduced, similarly to the above-described first embodiment.

The needle 163 having a cross section area, which is gradually reduced as toward downstream, is disposed in the end taper portion 161*d*, so that an increase degree of the refrigerant passage sectional area defined in the end taper portion 161*d* of the nozzle 160 can be more increased as compared with a case where the needle 163 is not disposed.

As a result, it can prevent the refrigerant jetted from the refrigerant injection port 161*a* from being unnecessary expanded in a nozzle radial direction that is perpendicular to the axial line φ, and the energy loss caused in the taper portion 161*d* can be reduced, thereby further restricting a decrease of the nozzle efficiency ηnoz.

(Fourth Embodiment)

Figure 7:
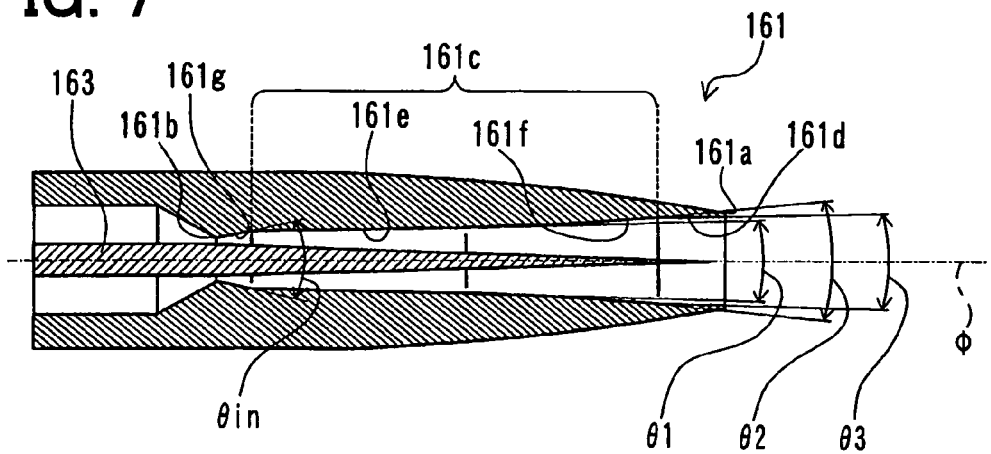
FIG. 7 is an enlarged sectional view showing a nozzle according to a fourth embodiment of the invention.

In a fourth embodiment, similarly to the above-described third embodiment, a needle 163 is arranged in the refrigerant passage of the nozzle 161, with respect to the above-described second embodiment, as shown in FIG. 7. Accordingly, in the present embodiment, the refrigerant passage sectional area of the circular-ring shaped refrigerant passage of the nozzle 161 in cross section is changed in a range from the throat portion 161*b* to the refrigerant jet port 161*a* via the introduction taper portion 161*g*, similarly to the change in the refrigerant passage sectional area of the nozzle 161 of the above-described second embodiment.

Other configurations and operation of the present embodiment are similar to those of the above-described second embodiment. Thus, in the ejector 16 of the present embodiment, the effects similar to the second embodiment can be obtained. In addition, similarly to the above-described third embodiment, it can restrict the refrigerant jetted from the refrigerant injection port 161*a* from being unnecessary expanded in a nozzle radial direction that is perpendicular to the axial line φ, and the energy loss caused in the end taper portion 161*d* can be reduced, thereby further restricting a decrease in the nozzle efficiency ηnoz.

(Fifth Embodiment)

In the above-described third and fourth embodiments, in order to make the change of the refrigerant passage sectional area of the circular ring shape in cross section between the outer peripheral surface of the needle 163 and the inner peripheral surface of the nozzle 161 to be similar to the change of the refrigerant passage sectional area of the nozzle 161 in the first and second embodiments, the taper portion 161*c* is divided into the first and second taper portions 161*e*, 161*f*. In contrast, in a fifth embodiment, the shape of a needle 163 used in the present embodiment is changed without dividing the taper portion 160*c* into two parts.

Specifically, the needle 163 of the present embodiment is divided into three reduction parts of an introduction reduction portion 163*a*, a first reduction portion 163*b* and a second reduction portion 163*c*. Furthermore, on the standard cross section, a reduction degree of the sectional area of the introduction reduction portion 163*a* is made larger than a reduction degree of the sectional area of the first reduction portion 163*b*, and a reduction degree of the sectional area of the second reduction portion 163*c* is made larger than a reduction degree of the sectional area of the first reduction portion 163*b*.

In the present embodiment, all the taper portion 161*c* of the nozzle 161 is formed into a straight line shape on the standard cross section. Thus, in the present, embodiment, the taper portion 161*c* is not divided into the first and second taper portions 161*e*, 161*f*.

Accordingly, in the present embodiment, the refrigerant passage sectional area of the circular-ring shaped refrigerant passage of the nozzle 161 is changed in a range from the throat portion 161*b* to the refrigerant jet port 161*a*, similarly to the change in the refrigerant passage sectional area of the nozzle 161 of the above-described second embodiment. Other configurations and operation of the present embodiment are similar to those of the above-described second embodiment.

Figure 8:
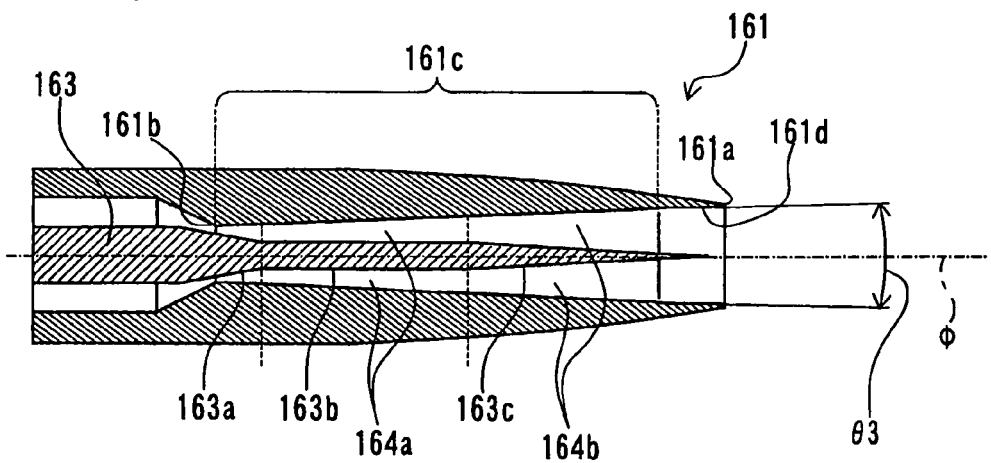
FIG. 8 is an enlarged sectional view showing a nozzle according to a fifth embodiment of the invention.

Thus, in the ejector 16 of the present embodiment, the same effects as in the fourth embodiment can be obtained. In the fifth embodiment shown in FIG. 8, the introduction reduction portion 163*a* may be not provided in the needle 163, and an introduction taper portion 161*g* shown in FIG. 7 may be provided in the nozzle 161. Even in this case, the same effect can be obtained. In the present embodiment shown in FIG. 8, the taper portion 161*c* of the nozzle 161 for defining the refrigerant passage together with the needle 163 is formed into a straight line shape on the standard cross section, and thereby the taper portion 161*c* can be easily formed.

In the present embodiment, the introduction reduction portion 163*a* may be omitted from the needle 163. In this case, the refrigerant passage sectional area of the circular-ring shaped refrigerant passage of the nozzle 161 in cross section is changed in a range from the throat portion 161*b* to the refrigerant jet port 161*a*, similarly to the change in the refrigerant passage sectional area of the nozzle 161 of the above-described first embodiment. Therefore, the same effects as in the third embodiment can be obtained.

(Sixth Embodiment)

In the present embodiment, in order to make the change of the refrigerant passage sectional area of the circular ring shape in cross section between the outer peripheral surface of the needle 163 and the inner peripheral surface of the nozzle 161 to be similar to the change of the refrigerant passage sectional area of the nozzle 161 in the above-described first or second embodiment, the taper portion 161*c* is divided into the first and second taper portions 161*e*, 161*f*, and at the same time, the shape of a needle 163 used in the present embodiment is also changed.

More specifically, in the present embodiment, the nozzle 161 provided with the first and second taper portions 161*e*, 161*f* and the end taper portion 161*d* similarly to the nozzle 161 of the above-described first embodiment, and the needle 163 provided with an introduction reduction portion 163*a*, first and second reduction portions 163b, 163c are combined thereby changing the refrigerant passage sectional area. The needle 163 is provided with the first and second reduction portions 163b, 163c, but the reduction degrees of the first and second reduction portions 163b, 163c are different from those of the above-described fifth embodiment.

Figure 9:
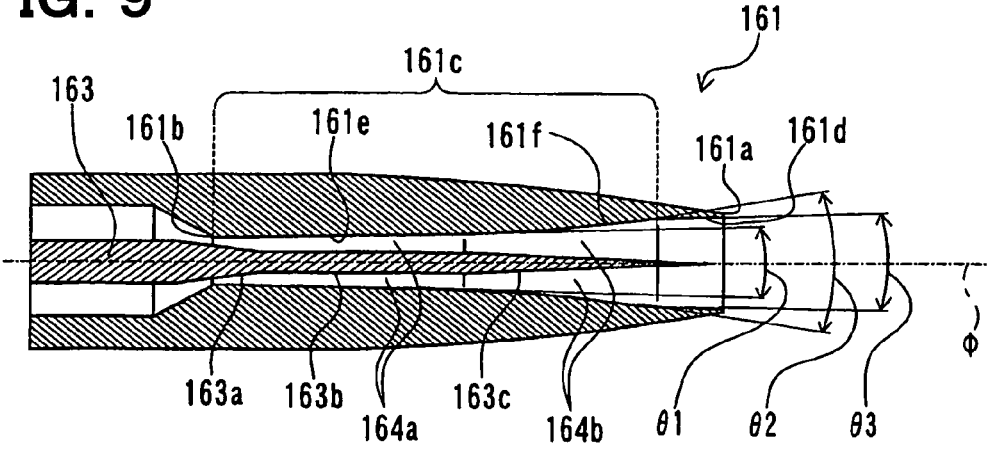
FIG. 9 is an enlarged sectional view showing a nozzle according to a sixth embodiment of the invention.

Other configurations and operation of the present embodiment are similar to those of the above-described second embodiment. Thus, in the ejector 16 of the present embodiment, the same effects as in the fourth embodiment can be obtained. In the sixth embodiment shown in FIG. 9, the introduction reduction portion 163a may be not provided in the needle 163, and an introduction taper portion 161g may be provided on the inner peripheral surface of the nozzle 161. Even in this case, the same effect can be obtained.

In the present embodiment, the nozzle 161 is provided with the first and second taper portions 161e, 161f and the end taper portion 161d, although the extending angles of the first and second taper portions 161e, 161f and the end taper portion 161d are different from that of the above-described first embodiment. Thus, the refrigerant passage sectional area of the circular-ring shaped refrigerant passage of the nozzle 161 in cross section can be changed, similarly to the change in the refrigerant passage sectional area of the nozzle 161 of the above-described first embodiment. Therefore, the same effects as in the third embodiment can be obtained.

By suitably combining the shapes of the outer peripheral surface of the needle 163 and the inner peripheral surface of the nozzle 161, the refrigerant passage sectional area of the circular-ring shaped refrigerant passage between the outer peripheral surface of the needle 163 and the inner peripheral surface of the nozzle 161 can be changed similarly to the change in the refrigerant passage sectional area of the nozzle 161 of the above-described first or second embodiment.

(Other Embodiment)

The present invention is not limited to the above-described embodiments, and the following various modifications are possible within the same scope as the invention.

(1) In the above-described embodiments, the ejector 16 is used for an ejector-type refrigerant cycle device 10 in which the refrigerant flow is branched in the branch portion 14 located upstream of the nozzle 161. However, the present invention is not limited to it. For example, in the ejector-type refrigerant cycle device 10 shown in FIG. 1, the expansion valve 13 may be located in the nozzle side pipe 15a extending from the branch portion 14 to the refrigerant inlet side of the nozzle 161 of the ejector 16.

Figure 10:
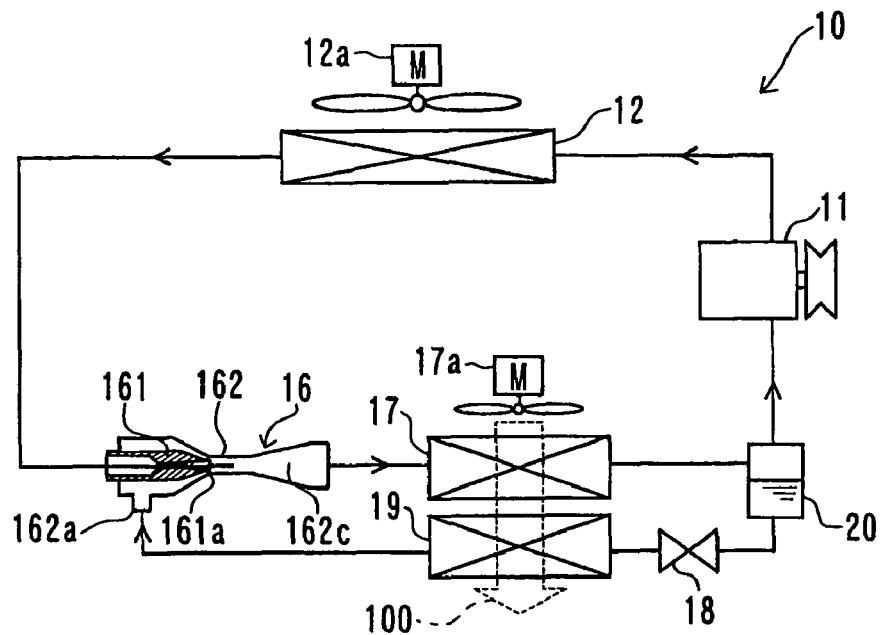
FIG. 10 is an entire schematic diagram showing one example of an ejector-type refrigerant cycle device according to the other embodiments.

For example, the ejector 16 of the present invention may be applied to an ejector-type refrigerant cycle device 10 shown in FIG. 10, in which the receiver 12b, the expansion valve 13, the branch portion 14 and the suction side pipe 15b are omitted as compared with the ejector-type refrigerant cycle device 10 shown in FIG. 1. In contrast, in the ejector-type refrigerant cycle device 10 shown in FIG. 10, a low-pressure gas-liquid separator (e.g., accumulator) 20 is arranged downstream of the diffuser portion 162c of the ejector 16, such that the liquid refrigerant separated in the accumulator 20 flows into the suction side evaporator 19. In the ejector-type refrigerant cycle device 10, the discharge side evaporator 17 may be omitted.

Figure 11:
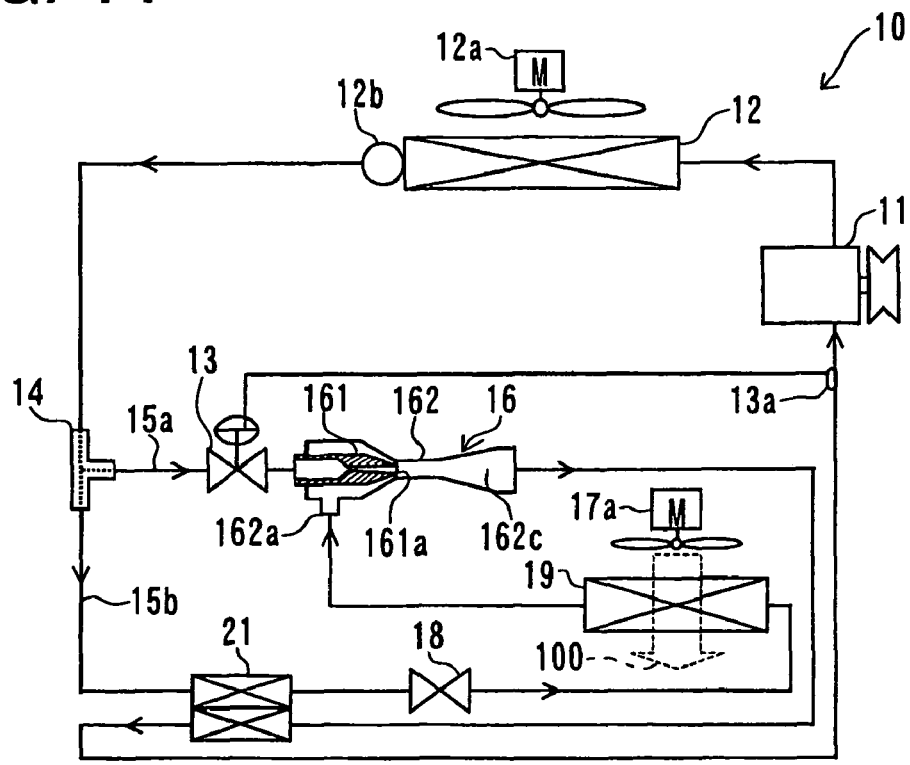
FIG. 11 is an entire schematic diagram showing another example of an ejector-type refrigerant cycle device according to the other embodiments.

The ejector 16 may be applied to an ejector-type refrigerant cycle device 10 shown in FIG. 11, in which the discharge side evaporator 17 is omitted, the expansion valve 13 is located in the nozzle side pipe 15a, and an inner heat exchanger 21 is provided, with respect to the ejector-type refrigerant cycle device 10 shown in FIG. 1. The inner heat exchanger 21 is provided to perform heat exchange between a low-pressure refrigerant flowing out of the ejector 16 and a high-pressure refrigerant flowing from the branch portion 14, into the suction side pipe 15b. In this case, the enthalpy of the refrigerant flowing into the suction side evaporator 19 can be decreased, and the refrigerating capacity obtained in the suction side evaporator 19 can be increased.

Figure 12:
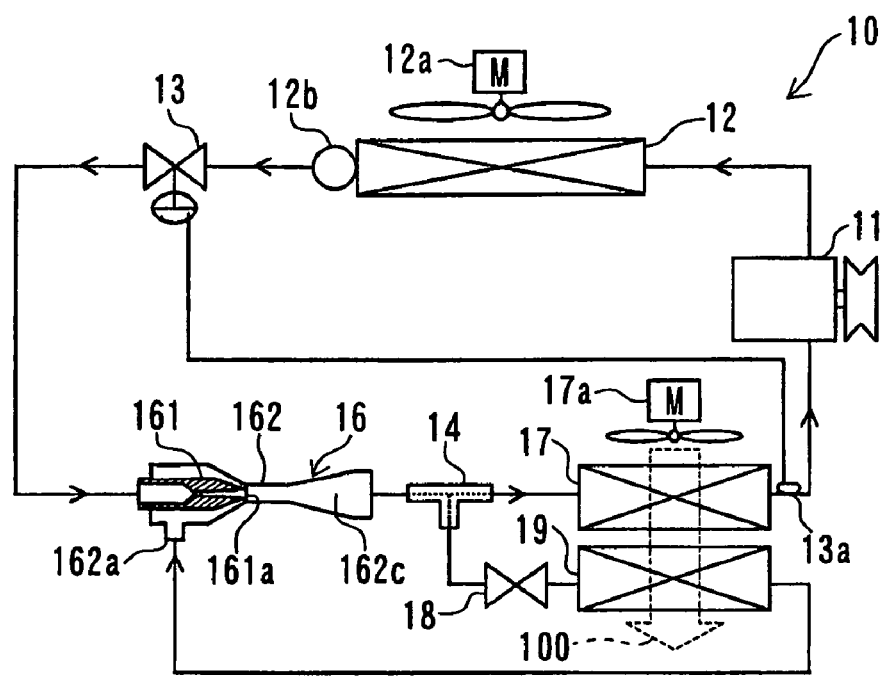
FIG. 12 is an entire schematic diagram showing another example of an ejector-type refrigerant cycle device according to the other embodiments.
Figure 13A:
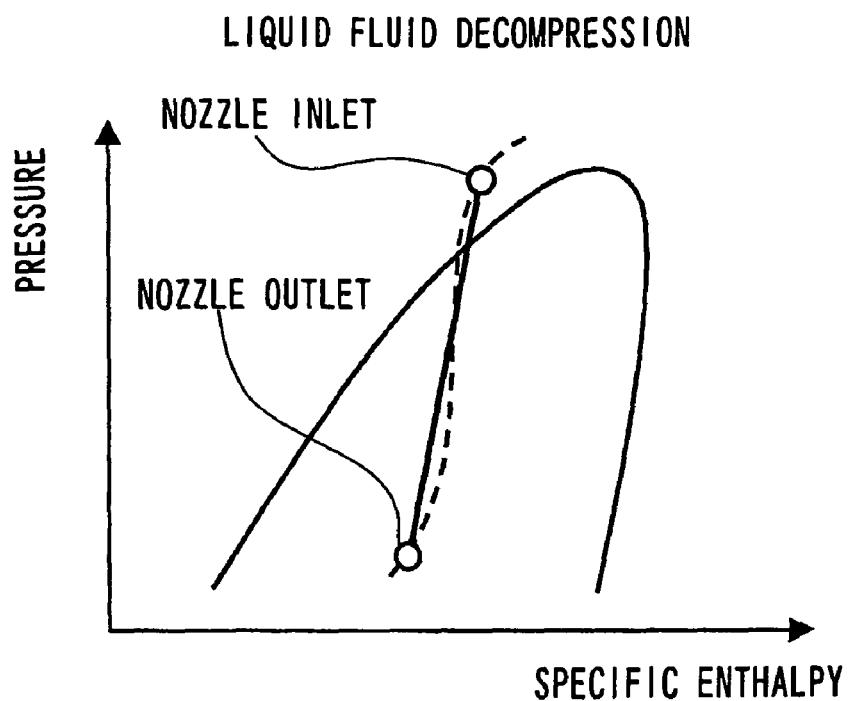
FIG. 13A is a Mollier diagram showing a decompression stage when a liquid fluid flows into a nozzle.
Figure 13B:
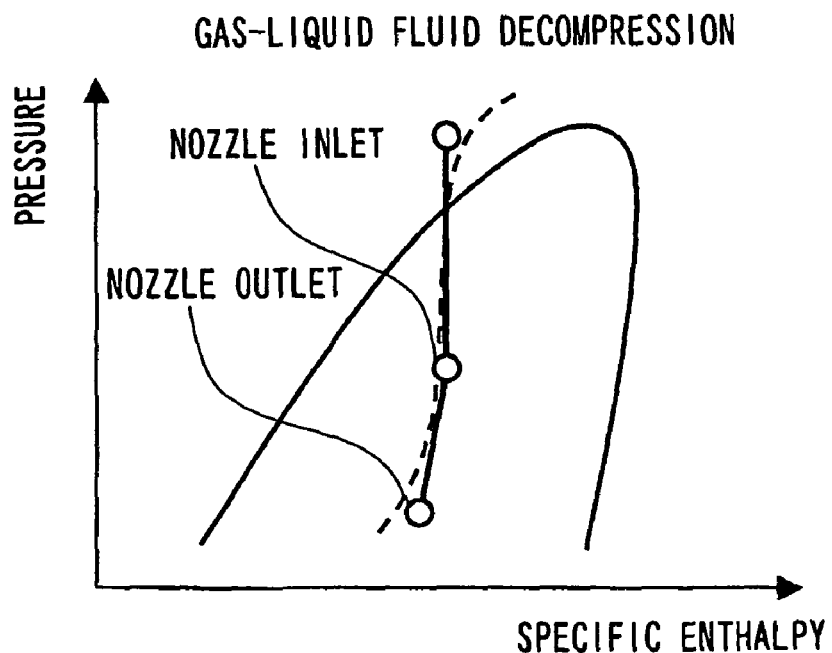
FIG. 13B is a Mollier diagram showing a decompression stage when a gas-liquid two-phase fluid flows into a nozzle.

Alternatively, the ejector 16 may be applied to an ejector-type refrigerant cycle device 10 shown in FIG. 12, in which the branch portion 14 is disposed at a refrigerant outlet side of the ejector 16, such that one refrigerant branched in the branch portion 14 is supplied to the discharge side evaporator 17 and other one refrigerant branched in the branch portion 14 flows into the suction side evaporator 19.

(2) In the above-described embodiments, a flon-based refrigerant is used as the refrigerant for a refrigerant cycle. However, the kind of the refrigerant is not limited to it. For example, hydrocarbon-based refrigerant, carbon dioxide, etc. may be used. Furthermore, the ejector 16 of the present invention may be applied to a super-critical refrigerant cycle in which a refrigerant pressure on the high-pressure side exceeds the critical pressure of the refrigerant.

(3) In the above-described embodiments, the ejector 16 of the present invention is used for an ejector-type refrigerant cycle device 10 for a vehicle air conditioner (i.e., a refrigeration cycle device for a vehicle). However, the present invention is not limited to it. The ejector of the present invention may be applied to an ejector-type refrigerant cycle device of a fixed type, such as a business-use refrigerating/cooling device, a cooling device for vending machines, a showcase with a refrigeration function, etc., in addition to the refrigeration cycle device for a vehicle.

(4) In the above-described embodiments, the discharge side evaporator 17 and the suction side evaporator 19 are integrally assembled to be integrated. As an integrated structure, components of both the evaporators 17, 19 may be made of aluminum, and may be bonded integrally by using bonding means such as brazing. Alternatively, the components of both the evaporators 17, 19 may be connected integrally by using a mechanical engagement means such as a bolt-fastening, while a space about 10 mm or less is provided between the discharge side evaporator 17 and the suction side evaporator 19.

A heat exchanger of a fin and tube type may be used as the discharge side evaporator 17 and the suction side evaporator 19. In this case, fins may be used in common in both the discharge side evaporator 17 and the suction side evaporator 19, and refrigerant passages of tubes contacting the fins may be configured to be separated from each other in both the evaporators 17 and 19.

(5) In the above-described embodiments, the discharge side evaporator 17 and the suction side evaporator 19 are adapted as an interior heat exchanger, and the radiator 12 is adapted as an exterior heat exchanger for radiating heat to the atmosphere. However, an ejector of the present invention may be applied to a heat pump cycle, in which the discharge side evaporator 17 and the suction side evaporator 19 are configured as the exterior heat exchanger to absorb heat from a heat source such as the atmosphere, and the radiator 12 may be configured as the interior heat exchanger for heating the refrigerant that is used to heat air or water to be heated.

The technical features of the above-described embodiments may be suitably combined if there are no contradiction therebetween.

What is claimed is:

1. An ejector comprising:
   a nozzle configured to decompress and expand a fluid and to jet the fluid from a fluid jet port; and a body provided with a fluid suction port from which a fluid is drawn by a high-speed jet fluid jetted from the fluid jet port, and a pressure increasing portion in which a velocity energy of a mixture fluid between the jet fluid and a suction fluid drawn from the fluid suction port is converted to a pressure energy thereof, wherein an inner peripheral surface of the nozzle defining a fluid passage includes a throat portion in which a fluid passage sectional area of the fluid passage is most reduced, a first taper portion arranged downstream of the throat portion to gradually enlarge the fluid passage sectional area as toward a flow direction of the jet fluid, a second taper portion arranged downstream of the first taper portion to gradually enlarge the fluid passage sectional area as toward the flow direction of the jet fluid, and an end taper portion arranged in a range from an outlet side of the second taper portion to the fluid jet port, to gradually enlarge the fluid passage sectional area as toward the flow direction of the jet fluid, when an axial cross section including an axial line of the nozzle is defined as a standard cross section, a second expanding angle at an outlet side of the second taper portion on the standard cross section is larger than a first expanding angle at an outlet side of the first taper portion on the standard cross section, and an end expanding angle at an outlet side of the end taper portion on the standard cross section is smaller than the second expanding angle.

2. The ejector according to claim 1, wherein
the second taper portion is formed into a curved line shape with a convex at the fluid passage side, on the standard cross section.

3. The ejector according to claim 1, wherein
the second taper portion is formed into a straight line shape on the standard cross section.

4. The ejector according to claim 1, wherein
the inner peripheral surface of the nozzle defining the fluid passage further includes an introduction taper portion arranged in a range from the throat portion to the first taper portion, to gradually enlarge the fluid passage sectional area as toward the flow direction of the jet fluid, and an introduction expanding angle at an outlet side of the introduction taper portion on the standard cross section is larger than the first expanding angle.

5. The ejector according to claim 4, wherein
the introduction taper portion is formed into a curved line shape with a convex at a radial outside of the nozzle, on the standard cross section.

6. The ejector according to claim 4, wherein
the introduction taper portion is formed into a straight line shape on the standard cross section.

7. The ejector according to claim 1, wherein
a ratio of the second expanding angle to the first expanding angle is equal to or larger than 1.33.

\* \* \* \* \*